US009838211B2

(12) United States Patent
Oh et al.

(10) Patent No.: US 9,838,211 B2
(45) Date of Patent: Dec. 5, 2017

(54) COMMUNICATION SYSTEM AND OPERATING METHOD USING HOME GATEWAY

(71) Applicant: Samsung Electronics Co., Ltd, Gyeonggi-do (KR)

(72) Inventors: Hee-Jin Oh, Gyeonggi-do (KR); Dae-Hyun Sim, Seoul (KR); Chang-Seok Lee, Chungcheongnam-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 817 days.

(21) Appl. No.: 13/672,472

(22) Filed: Nov. 8, 2012

(65) Prior Publication Data

US 2013/0114616 A1 May 9, 2013

(30) Foreign Application Priority Data

Nov. 8, 2011 (KR) .......................... 10-2011-0115829

(51) Int. Cl.
*H04L 12/28* (2006.01)

(52) U.S. Cl.
CPC ................................ *H04L 12/2834* (2013.01)

(58) Field of Classification Search
CPC . H04L 12/2832; H04L 12/2834; H04L 67/16; H04L 67/125; H04L 63/0892; H04L 65/102; H04W 12/06; H04W 92/02
See application file for complete search history.

(56) References Cited

U.S. PATENT DOCUMENTS

| 7,747,721 | B2 * | 6/2010 | Savoor ................... G06Q 30/08 370/401 |
| 9,154,487 | B2 * | 10/2015 | Murakami .............. H04L 63/08 |
| 2002/0013832 | A1 | 1/2002 | Hubbard |
| 2002/0058515 | A1 * | 5/2002 | Holler ............... H04L 29/06027 455/455 |
| 2003/0172136 | A1 * | 9/2003 | Katagawa ............... G06F 9/547 709/220 |

(Continued)

FOREIGN PATENT DOCUMENTS

| KR | 10-2009-0061702 | 6/2009 |
| KR | 20100060547 A | 6/2010 |

OTHER PUBLICATIONS

International Search Report dated Mar. 28, 2013 in connection with International Patent Application No. PCT/KR2012/009389, 3 pages.

(Continued)

*Primary Examiner* — Hoang-Chuong Vu

(57) ABSTRACT

A communication system and operating method use a home gateway. A method of a terminal in a communication system using a home gateway includes transmitting a service request signal using the home gateway to an adjacent node; receiving information of at least one home gateway of other user from the adjacent node; and transmitting and receiving signals to and from the at least one home gateway of other user. A method of a home gateway in the communication system using the home gateway includes receiving information of a user of other home gateway from a home gateway server; and transmitting and receiving signals to and from a user terminal of the other home gateway.

10 Claims, 16 Drawing Sheets

(56) References Cited

U.S. PATENT DOCUMENTS

| | | | | |
|---|---|---|---|---|
| 2003/0214955 | A1* | 11/2003 | Kim | H04L 12/4633 370/400 |
| 2004/0218611 | A1* | 11/2004 | Kim | H04L 12/4633 370/401 |
| 2006/0133391 | A1* | 6/2006 | Kang | H04L 12/2805 370/401 |
| 2007/0061430 | A1* | 3/2007 | Kim | H04L 12/2803 709/220 |
| 2007/0275715 | A1* | 11/2007 | Lee | H04L 12/2814 455/427 |
| 2010/0128571 | A1 | 5/2010 | Roh et al. | |
| 2010/0135279 | A1* | 6/2010 | Petersson | H04L 67/16 370/352 |
| 2010/0144362 | A1* | 6/2010 | Bernard | H04L 12/2856 455/452.1 |
| 2010/0180312 | A1* | 7/2010 | Toya | H04L 12/2812 725/78 |
| 2010/0218248 | A1* | 8/2010 | Nice | H04L 63/0272 726/12 |
| 2010/0325695 | A1* | 12/2010 | Suzuki | G06F 21/10 726/3 |
| 2012/0026865 | A1* | 2/2012 | Fan | H04W 76/02 370/225 |
| 2012/0099584 | A1* | 4/2012 | Chiang | H04L 12/2836 370/352 |
| 2013/0227660 | A1* | 8/2013 | Murakami | H04L 63/062 726/5 |

OTHER PUBLICATIONS

Written Opinion of International Searching Authority dated Mar. 28, 2013 in connection with International Patent Application No. PCT/KR2012/009389, 5 pages.

Feng-Chao Yang, "Design and Implement of the Home Networking Service Agent Federation Using Open Service Gateway", International Conference on Integration of Knowledge Intensive Multi-Agent Systems, pp. 628-633, Oct. 1-3, 2003.

Dong-Oh Kang et al., "UPnP AV Architectural Multimedia System with a Home Gateway Powered by the OSGi Platform," IEEE Transactions on Consumer Electronics, vol. 51, No. 1, pp. 87-93, Jan. 15, 2005.

* cited by examiner

COMMUNICATION SYSTEM AND OPERATING METHOD USING HOME GATEWAY

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Nov. 8, 2011, and assigned Serial No. 10-2011-0115829, the entire disclosure of which is hereby incorporated by reference.

TECHNICAL FIELD OF THE INVENTION

The present disclosure relates generally to a communication system. More particularly, the present disclosure relates to a communication system using a home gateway.

BACKGROUND OF THE INVENTION

Based on development of information communication technologies, a home network system is supplied to collectively manage information devices in the home, such as TV, PC, and mobile terminal, by establishing a network. The home network system connects a plurality of digital devices using a home gateway and allows the digital devices (e.g., TV, computer, mobile terminal, copier, refrigerator, air conditioner, etc.) connected via the home gateway to share various contents such as music, photo, and movie.

In the home network system, the home gateway is connected to Internet to transmit and receive data in association with the devices in the home. In this regard, communication methods using the home gateway in the home are studied.

For example, a user can access his/her home gateway outside the home and use the contents of the home devices connected to the home gateway. That is, a user terminal outside the home can access the user terminal's home gateway via an Access Point (AP) of a wireless network and fetch the content of the home device connected to the home gateway or store the content to the device. However, when the channel condition between the user terminal and the wireless network AP is not good, it is hard to use the home gateway access using the wireless network AP. When load of routers associated with the AP is high, the data transfer rate is degraded to cause inconvenience of the user.

Thus, what is needed is a method for accessing the home gateway by avoiding the poor channel condition between the user terminal and the wireless network AP or the high load of the routers associated with the AP.

SUMMARY OF THE INVENTION

To address the above-discussed deficiencies of the prior art, it is a primary aspect of the present disclosure to provide a communication network system and operating method using a home gateway.

Another aspect of the present disclosure is to provide a method and an apparatus of a user terminal of a particular home gateway for communicating using a home gateway of other user terminal by building a distributed parallel computing network (hereafter, referred to as a home gateway network) including a plurality of distributed home gateways.

Yet another aspect of the present disclosure is to provide a method and an apparatus of a user terminal for accessing the terminal's home gateway using a home gateway of other user terminal in a home gateway network.

Still another aspect of the present disclosure is to provide a method and an apparatus for transmitting data of a user to a particular home gateway using home gateways establishing a home gateway network.

A further aspect of the present disclosure is to provide a method and an apparatus for temporarily storing data of other user using a common storage space in a home gateway.

A further aspect of the present disclosure is to provide a method and an apparatus of a home gateway server for managing resource and user service by considering conditions of home gateways.

According to one aspect of the present disclosure, a method of a terminal in a communication system using a home gateway includes transmitting a service request signal using the home gateway to an adjacent node; receiving information of at least one home gateway of other user from the adjacent node; and transmitting and receiving signals to and from the at least one home gateway of other user.

According to another aspect of the present disclosure, a method of a home gateway in a communication system using the home gateway includes receiving information of a user of other home gateway from a home gateway server; and transmitting and receiving signals to and from a user terminal of the other home gateway.

According to yet another aspect of the present disclosure, a method of a server in a communication system using a home gateway includes receiving a signal informing that a user terminal requests a service using the home gateway; authenticating the user terminal; determining at least one home gateway based on a location of the user terminal and a location per home gateway; and directing the at least one determined home gateway to communicate with the user terminal.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a method and an apparatus of a user for communicating using a home gateway of other user by building a distributed parallel computing network (hereafter, referred to as a home gateway network) including a plurality of home gateways.

Figure 1:
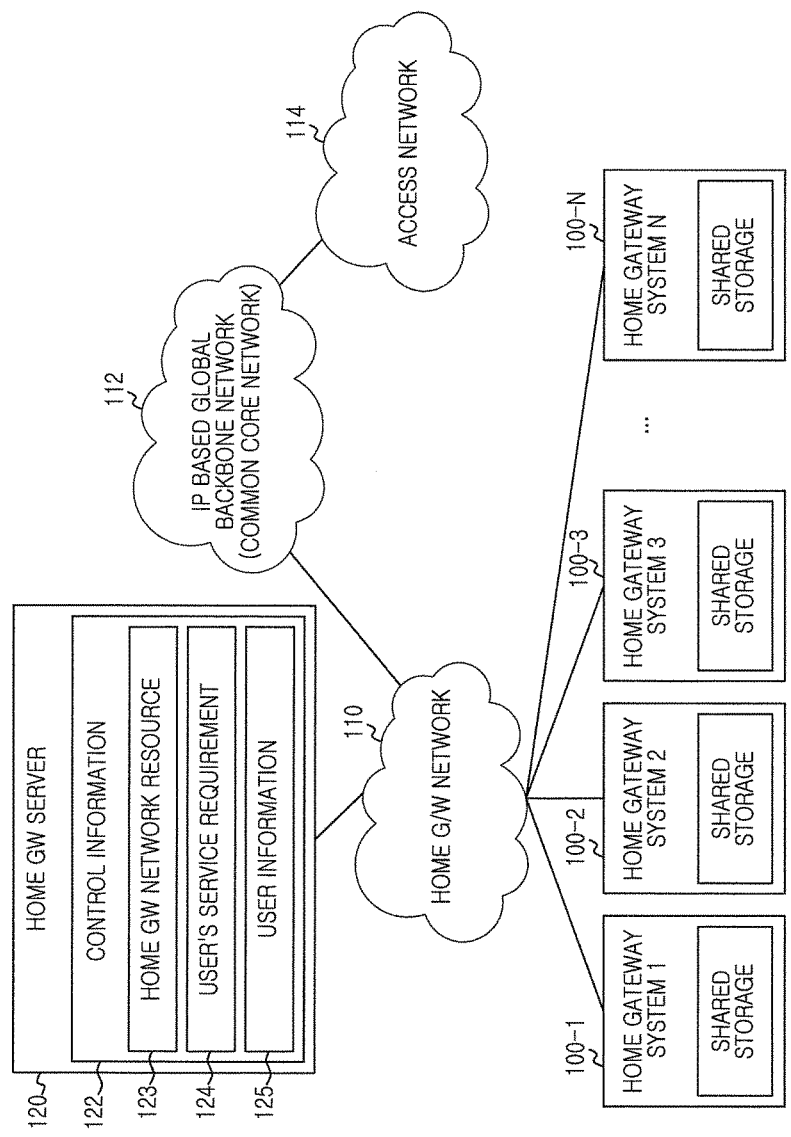
FIG. 1 illustrates system configuration of a home gateway network according to an exemplary embodiment of the present disclosure.

FIG. 1 depicts system configuration of a home gateway network according to an exemplary embodiment of the present disclosure.

Referring to FIG. 1, the home gateway network system includes a plurality of distributed home gateway systems 100-1 through 100-N (hereafter, referred to as home gateways), and a home gateway server 120 for managing a home gateway network 110 associated with the home gateways 100-1 through 100-N.

The home gateways 100-1 through 100-N can share content with devices over wire or wirelessly in home or office, and connect to the Internet. The home gateways 100-1 through 100-N share various resources between the devices associated with the respective home gateways. For example, the home gateways and the devices associated with the home gateways share the resources such as computing power of a Central Processing Unit (CPU), main memory unit, an image processing unit, and auxiliary memory unit. A memory unit connected to the network is referred to as a Network Attached Storage (NAS). Herein, part of the NAS memory unit is set to a shared storage and used for the communication based on the home gateway network system. Hereafter, to ease the understanding, other storage not set to the shared storage in the NAS memory unit is referred to as a dedicated storage.

The home gateways 100-1 through 100-N build the distributed parallel computing network, that is, the home gateway network 110 by interworking over the Internet. The home gateways 100-1 through 100-N detect a service request signal of an ambient user terminal, report the service request signal detection to the home gateway server 120, and communicate with the ambient user terminal under the control of the home gateway server 120. The home gateways 100-1 through 100-N store their user data received from the other home gateway to the dedicated storage, and forward the user data stored to the dedicated storage to the other home gateway under the control of the home gateway server 120. The home gateways 100-1 through 100-N receive data of other user from the ambient user terminal or the other home gateway, temporarily stores the received data to the shared storage, and sends the stored data to the ambient user terminal or the other home gateway under the control of the home gateway server 120. The home gateways 100-1 through 100-N report a current traffic condition, an available capacity of the shared storage, and a wireless access use status to the home gateway serer 120 on the periodic basis or at every preset point.

The home gateway server 120 manages the plurality of the home gateways 100-1 through 100-N building the home gateway network 110. The home gateway server 120 collects and manages control information 122 including home gateway network resource information 123, user's service requirement information 124, and user information 125, and controls and manages the user communication via the home gateway of the other user, rather than the user terminal's home gateway, based on the those information. For example, the home gateway server 120 allows the user terminal to communicate via the home gateway of the other user, rather than the user terminal's home gateway, by authenticating the user terminal which requests the service, determines a home gateway path for the service requested by the user terminal, and controls to set the communication path. The home gateway server 120 divides and stores the user data to the plurality of the home gateways, recombines the divided and stored data, and encrypts the user data. The home gateway server 120 maintains and manages the user request service, detects movement of the user, and determines or changes the home gateway according to the movement location. Herein, the home gateway network resource 123 includes the traffic condition (e.g., delay, jitter, and packet loss) per home gateway 100-1 through 100-N, the wireless access use status per home gateway 100-1 through 100-N, the available capacity of the shared storage per home gateway 100-1 through 100-N, locations of the home gateways 100-1 through 100-N, and an expected transmission time using the home gateways 100-1 through 100-N. The user's service requirement information 124 includes a file name of the data requested by the user, a file transmission location, a destination location, an expected destination arrival time of the user, and a user's current location. The user information 125 includes user home gateway information, user authentication information, and user's subscription service information.

Herein, the home gateway network 110 interworks with an access network 114 over an Internet Protocol (IP) based global backbone network 112. The home gateway server 120 may determine the service path of the user terminal by considering the access network 114.

Now, the communication of the user terminal outside the home via the home gateway of the other user terminal in the home gateway network including the plurality of the distributed home gateways is elucidated by referring to FIGS. 2 through 5.

Figure 2:
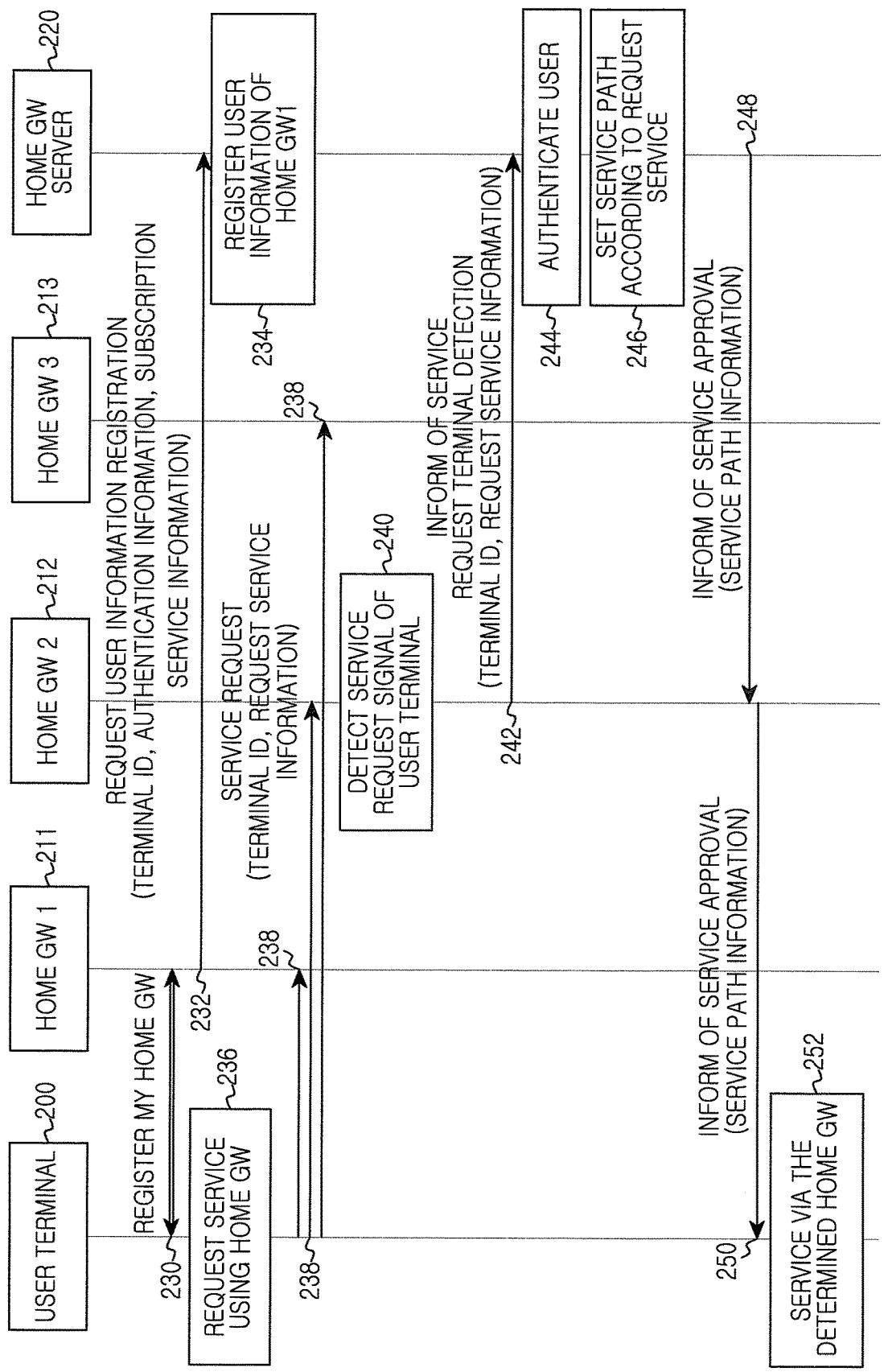
FIG. 2 illustrates signaling of a user terminal for communicating via a home gateway of other user terminal in the home gateway network according to an exemplary embodiment of the present disclosure.

FIG. 2 illustrates signaling of a user terminal for communicating via a home gateway of other user terminal in the home gateway network according to an exemplary embodiment of the present disclosure.

Referring to FIG. 2, a user terminal 200 registers to a first home GateWay (GW) 211 in step 230. Herein, the user terminal 200 can register the user authentication information and the user subscription service information to the home GW 211 through the registration procedure, and the registration procedure of the user terminal 200 can be carried out according to a conventional home GW registration procedure which is well known. Next, the first home GW 211 requests the user information registration of the user terminal 200 to a home GW server 220 in step 232. In so doing, the first home GW 211 transmits the first home GW's 211 identifier (ID), an ID of the user terminal 200, the user authentication information, the user subscription service information, and the location information of the first home GW 211. The home GW server 220 registers the user information received from the first home GW 211 in step 234.

When the user terminal 200 requests the service using the home GW in step 236, the user terminal 200 sends a service request signal in step 238. Herein, the service request signal includes the user terminal ID, and may include information of the requested service. The user terminal 200 broadcasts the service request signal so that a second home GW 212, a third home GW 213, and an AP (not shown) of the access network which are geographically adjacent can receive the signal.

Next, the second home GW 212 detects the service request signal of the user terminal 200 in step 240 and sends to the home GW server 220 a signal informing of the service request detection of the user terminal 200 in step 242. Herein, the signal informing of the service request detection of the user terminal 200 includes the ID of the user terminal and may include the request service information of the user terminal.

The home GW server 220 performs the user authentication procedure on the user terminal 200 based on the pre-stored user information in step 244, and sets the service path for providing the service requested by the user terminal in step 246. Herein, based on home GW network resource information pre-stored, the user's service requirement information, and the user information, the home GW server 220 sets the home GW for building the service path. In so doing, the home GW server 220 may set the service path according to a service type requested by the user and the condition of the home GWs so that the plurality of the home GWs around the user terminal can communicate with the user terminal.

The home GW server 220 sends a signal informing of the terminal service approval in step 248, and the second home GW 211 forwards the signal informing of the service approval to the user terminal 200 in step 250. The service approval signal can include the service path information of the user terminal 200. For example, when the home GW server 220 determines the second home GW 212 as the home GW for communicating with the user terminal 200, the second home GW 212 can recognize from the service approval signal that the second home GW 212 needs to communicate with the user terminal 200 and the user terminal 200 can recognize that the user terminal 200 needs to communicate with the second home GW 212. For example, when the home GW server 220 determines the second home GW 212 and the third home GW 213 as the home GW for communicating with the user terminal 200, the service approval signal can be transmitted to the second home GW 212 and the third home GW 213 and the second home GW 212 and the third home GW 213 each can forward the service approval signal to the user terminal 200.

The user terminal 200 identifies the home GW determined as the service path based on the signal informing of the service approval and communicates for the service via the determined home GW in step 252.

While the second home GW 212 detects and reports the service request signal of the user terminal 200 to the home network server 220, the service request signal of the user terminal 200 may be received by the AP of the access network around the user terminal 200 and reported to the home network server via the access network.

Hereafter, it is assumed that the registration procedure between the user terminal and the home GW and the registration procedure between the home GW and the home GW server are conducted in advance. To ease the understanding, the home GW registered by the user terminal is referred to as a "my home".

Figure 3:
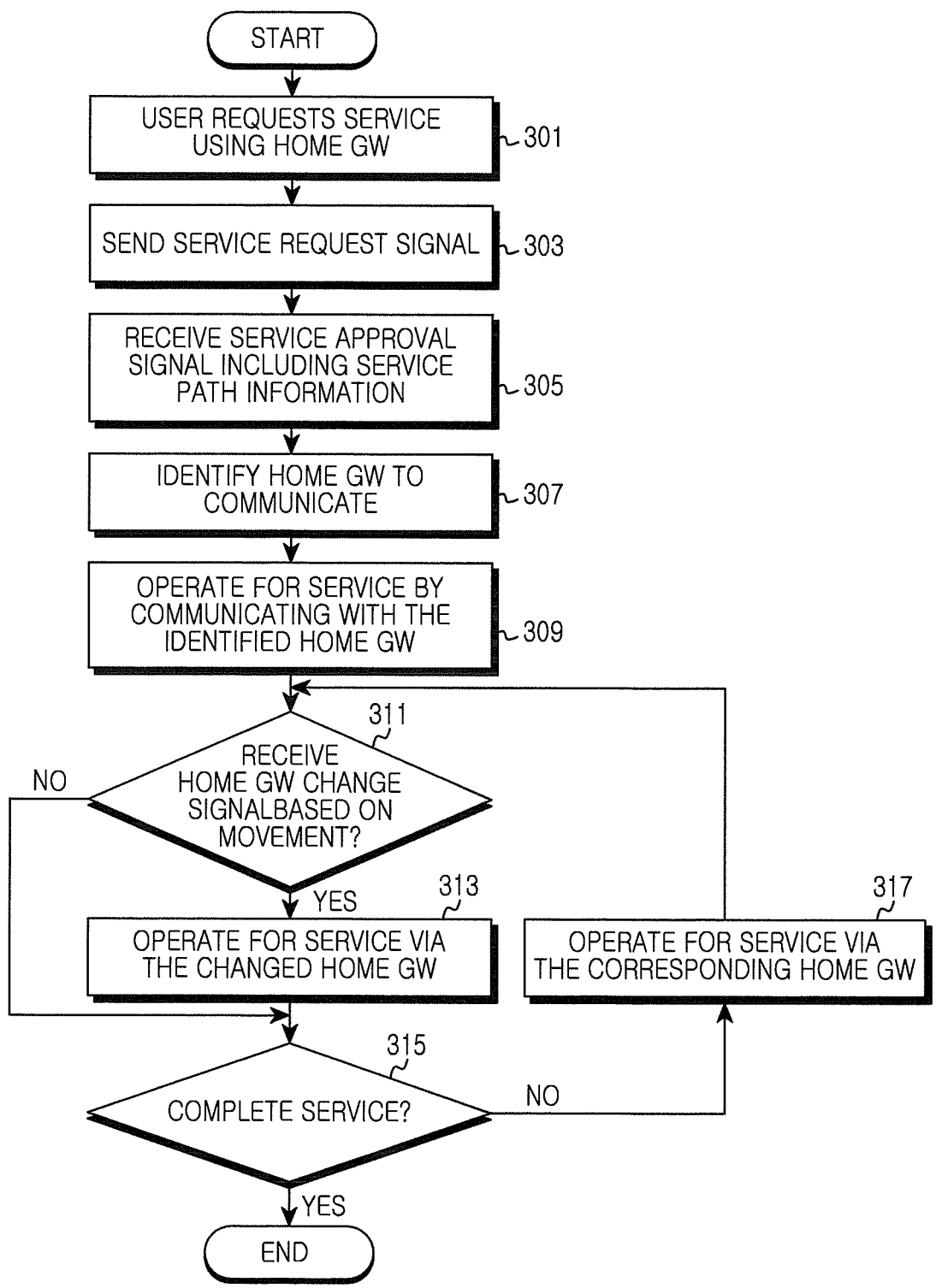
FIG. 3 illustrates operations of the user terminal supporting the home gateway network according to an exemplary embodiment of the present disclosure.

FIG. 3 illustrates operations of the user terminal supporting the home gateway network according to an exemplary embodiment of the present disclosure.

Referring to FIG. 3, the user terminal receives the service request using the home GW from the user in step 301. Herein, the service using the home GW is a communication service using the home GW of some other user than the my home outside the home. For example, the service using the home GW includes a service for transmitting data to the my home, a service for transferring the data stored to the my home to other location, and the Internet service.

In step 303, the user terminal sends the service request signal. Herein, the service request signal can include the user terminal ID and the request service information. The user terminal broadcasts the service request signal so that the geographically adjacent home GWs and the AP (not shown) of the access network can receive the service request signal.

In step 305, the user terminal receives the service approval signal including the service path information. Herein, the service path information includes information of at least one home GW for directly communicating with the user terminal. The service approval signal including the service path information may be received from the adjacent home GW or from the adjacent access network AP. Notably, the service path information may include the access network AP information according to the situation around the user terminal.

Next, the user terminal identifies the home GW for directly communicating with the user terminal in step 307, and operates according to the service by communicating with the identified home GW in step 309. For example, the user terminal can transmit the data to store to the my home to the home GW, receive the data moved from the my home to the home GW, from the home GW, and transmit and receive signals for using the Internet service via the home GW.

In step 311, the user terminal determines whether a signal indicating the home GW change according to the movement of the user terminal is received. When not receiving the signal indicating the home GW change, the user terminal goes to step 315. When receiving the signal indicating the home GW change, the user terminal operates according to the service via the changed home GW in step 313.

In step 315, the user terminal determines whether the service is completed. The service completion can be determined by receiving a service completion signal from the home GW, or according to a user's input. When the service is not completed, the user terminal operates according to the service via the corresponding home GW in step 317. By contrast, when the service is completed, the user terminal finishes this process.

The method described above in relation with FIG. 3 under of the present invention may be provided as one or more instructions in one or more software modules stored in the respective user terminals.

Figure 4:
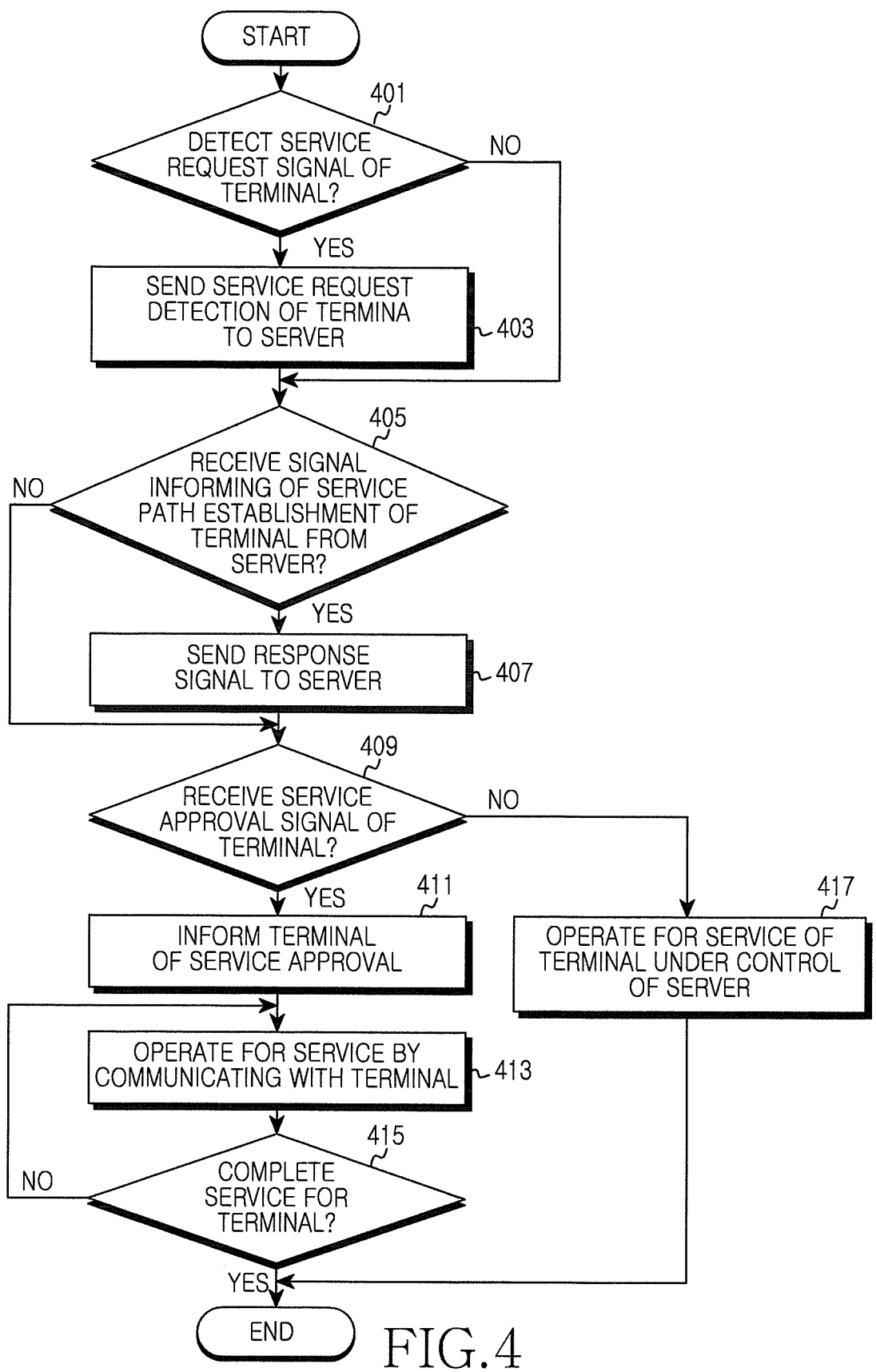
FIG. 4 illustrates operations of the home gateway of the home gateway network according to an exemplary embodiment of the present disclosure.

FIG. 4 illustrates operations of the home GW of the home GW network according to an exemplary embodiment of the present disclosure.

Referring to FIG. 4, the home GW determines whether the service request signal of the terminal is detected in step 401. When not detecting the service request signal, the home GW goes to step 405. By contrast, upon detecting the service request signal, the home GW sends to the home GW server the signal informing of the service request detection of the terminal in step 403. Herein, the signal informing of the service request detection of the terminal includes the ID of the terminal and can include the information of the request service of the terminal.

In step 405, the home GW determines whether the signal informing of the service path establishment of the terminal is received from the home GW server. When not receiving the signal informing of the service path establishment of the terminal, the home GW proceeds to step 409. Upon receiving the signal informing of the service path establishment of the terminal, the home GW sends a response signal to the server in step 407.

In step 409, the home GW determines whether the service approval signal of the terminal is received from the home GW server. When not receiving the service approval signal of the terminal, the home GW performs the service related operation of the terminal under the control of the server in step 417. That is, the home GW can transmit and receive signals for the service of the terminal to and from the other home GW or the AP of the access network.

By contrast, upon receiving the service approval signal of the terminal, the home GW sends the signal informing of the service approval to the corresponding terminal in step 411 and operates according to the service by communicating with the terminal in step 413. For example, under the control of the home GW server, the home GW can temporarily store and transmit the data received from the terminal to the other home GW, or temporarily store and transmit the data received from the other home GW to the terminal. The home GW can forward a signal received from the terminal to an Internet service server, and forward a signal received from the Internet service server to the terminal.

In step 415, the home GW determines whether the service for the terminal is completed. The service completion for the terminal can be determined by receiving the service end signal from the home GW server or the terminal. When the service for the terminal is not completed, the home GW returns to step 413. When the service for the terminal is completed, the home GW finishes this process.

The method described above in relation with FIG. 4 under of the present invention may be provided as one or more instructions in one or more software modules stored in the respective home GW.

Figure 5:
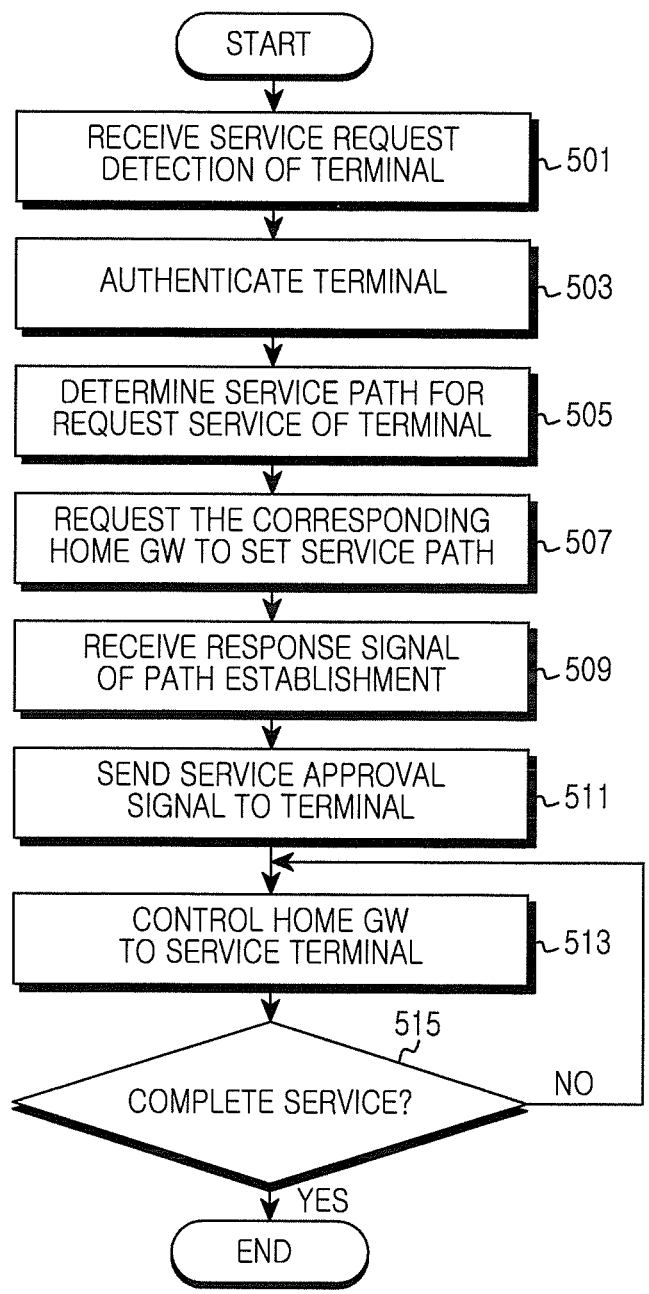
FIG. 5 illustrates operations of a server for managing the home gateway network according to an exemplary embodiment of the present disclosure.

FIG. 5 illustrates operations of a server for managing the home gateway network according to an exemplary embodiment of the present disclosure.

Referring to FIG. 5, the home GW server receives the signal informing of the service request detection of the terminal in step 501. The signal informing of the service request detection of the terminal can be received from the home GW or the AP of the access network.

In step 503, the home GW server authenticates the terminal requesting the service. That is, the home GW can determine whether to provide the service by checking whether the service requesting terminal is the terminal subscribed to the home GW service based on the pre-stored user information. In so doing, when the service requested by the terminal requests the access to the my home, the home GW server may request an authentication key of the my home to the terminal, receive the authentication key, and then determine whether the terminal is authorized to access to the my home, which is not depicted here.

In step 505, the home GW server determines the service path for providing the service by considering the service requested by the terminal. For example, when the service requested by the terminal is the service for transmitting the data to the my home, the home GW server determines at least one home GW for transmitting and receiving data between the user terminal and the my home by considering the location of the my home, the location of the user terminal, the traffic condition per home GW, the wireless access use status per home GW, and the available capacity of the shared storage per home GW. For example, when the service requested by the terminal is a service for transferring the data of the my home to a particular destination, the home GW server can determine at least one destination home GW by considering the location of the destination. For example, when the service requested by the terminal is the Internet service, the home GW server can determine at least one home GW for transmitting and receiving signals to and from the terminal.

Next, the home GW server requests the at least one home GW determined as the service path to build the service path in step 507, and receives a response signal for the path establishment from the home GW in step 509.

In step 511, the home GW server transmits the signal indicating the service approval to the terminal. The signal indicating the service approval includes the service path information of the terminal, and may be transmitted via the home GW determined as the service path or via the AP of the access network.

In step 513, the home GW server controls the home GW for the service of the terminal. For example, the home GW server determines whether the service path needs to change by detecting the movement of the terminal. Upon determining that the service path needs to change, the home GW server changes the service path and operates to provide the service to the terminal.

In step 515, the home GW server determines whether the service of the terminal is completed. The service completion of the terminal can be determined by completing the service requested by the terminal or receiving the signal indicating the service end from the terminal. When the service is not over, the home GW server goes back to step 513. When the service is completed, the home GW server finishes this process.

The method described above in relation with FIG. 3 under of the present invention may be provided as one or more instructions in one or more software modules stored in the respective home GW server.

Now, the service using the home GW network is explained in detail with three examples. Hereafter, it is assumed that the access scheme of the home GW and the access scheme of the access network AP can be the same or different, and that the user terminal is already subscribed to the service for using the access network AP. Herein, when the access scheme of the home GW and the access scheme of the access network AP are different from each other, the terminal should be a dual-mode terminal supporting both of the access scheme of the home GW and the access scheme of the access network AP.

In the first example, the user terminal outside the home transmits data to the my home.

Figure 6:
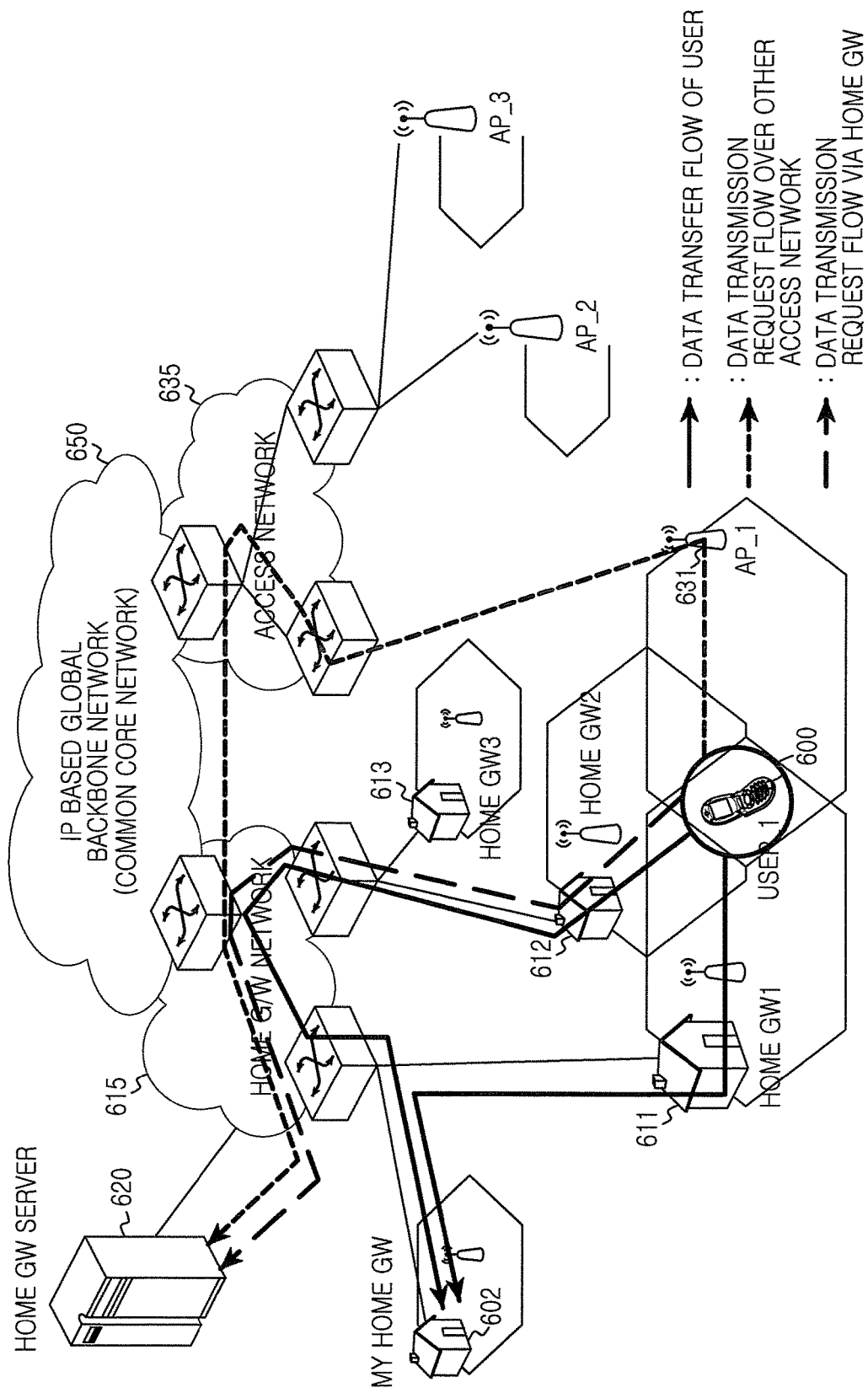
FIG. 6 illustrates signal flows of the user terminal for transmitting data to the user terminal's home gateway using the home gateway network according to an exemplary embodiment of the present disclosure.

FIG. 6 illustrates signal flows of the user terminal for transmitting data to the user terminal's home GW using the home GW network according to an exemplary embodiment of the present disclosure.

As shown in FIG. 6, a user terminal User_I 600 registered to a my home 602 is assumed to travel in an overlapping location of a region of a home GW1 611, a region of a home GW2 612, and a region of an AP_1 631 of the access network.

In this situation, when the user terminal 600 requests the service for transmitting data to the my home, the home GW1 611 and the home GW2 612 detect and report the service request of the user terminal 600 to a home GW server 620. The AP 631 may detect and report the service request of the user terminal 600 to the home GW server 620 of the home GW network 615 over a backbone network 650 associated with the access network 635. In so doing, the home GW1 611, the home GW2 612, and the AP 631 can locate the user terminal and report the terminal location to the home GW server 620. The home GW server 620 authenticates the user terminal 600, and sets the service path by determining the home GW capable of communicating with the user terminal 600 using the physical locations of the home GW1 611 and the home GW2 612 detecting the service request of the user terminal 600 or the reported terminal location. At this time, since the user terminal 600 travels in the overlapping region of the region of the home GW1 611 and the region of the home GW2 612, the home GW server 620 can determine the home GW1 611 and the home GW2 612 as the service path of the user terminal 600. Notably, the home GW server 620 may select either home GW by considering the traffic condition, the wireless access use status, and the available capacity of the shared storage of the home GW1 611 and the home GW2 612, or determine data capacity of the two home GWs to receive from the terminal. In so doing, the home GW server 620 can set the routing path between the my home and the home GW1 611 and the home GW2 612. Next, the home GW server 620 transmits the service path information to the home GW1 611 and the home GW2 612 which are set to the service path, and the user terminal 600 so that the user terminal 600 can transmit data to the home GW1 611 and the home GW2 612. Under the control of the home GW server 620, the user terminal 600 can divide the data in a certain size and transmit the data to the home GW1 611 and the home GW2 612. The home GW1 611 and the home GW2 612 can forward the data received from the user terminal 600 to the my home 602 under the control of the home GW server 620.

That is, in the related art, the user access authority is defined per home GW and the user terminal 600 cannot use the home GW of some other user than the my home. By contrast, the home GW server of the present disclosure authenticates the user terminal 600 so that the access to the home GW of the user terminal 600 is permitted and the user terminal 600 can use the home GW of the other user than the my home. While the user terminal 600 can utilize the shared storage by accessing the home GW of the other user terminal, the user terminal 200 cannot use the dedicated storage.

Figure 7A:
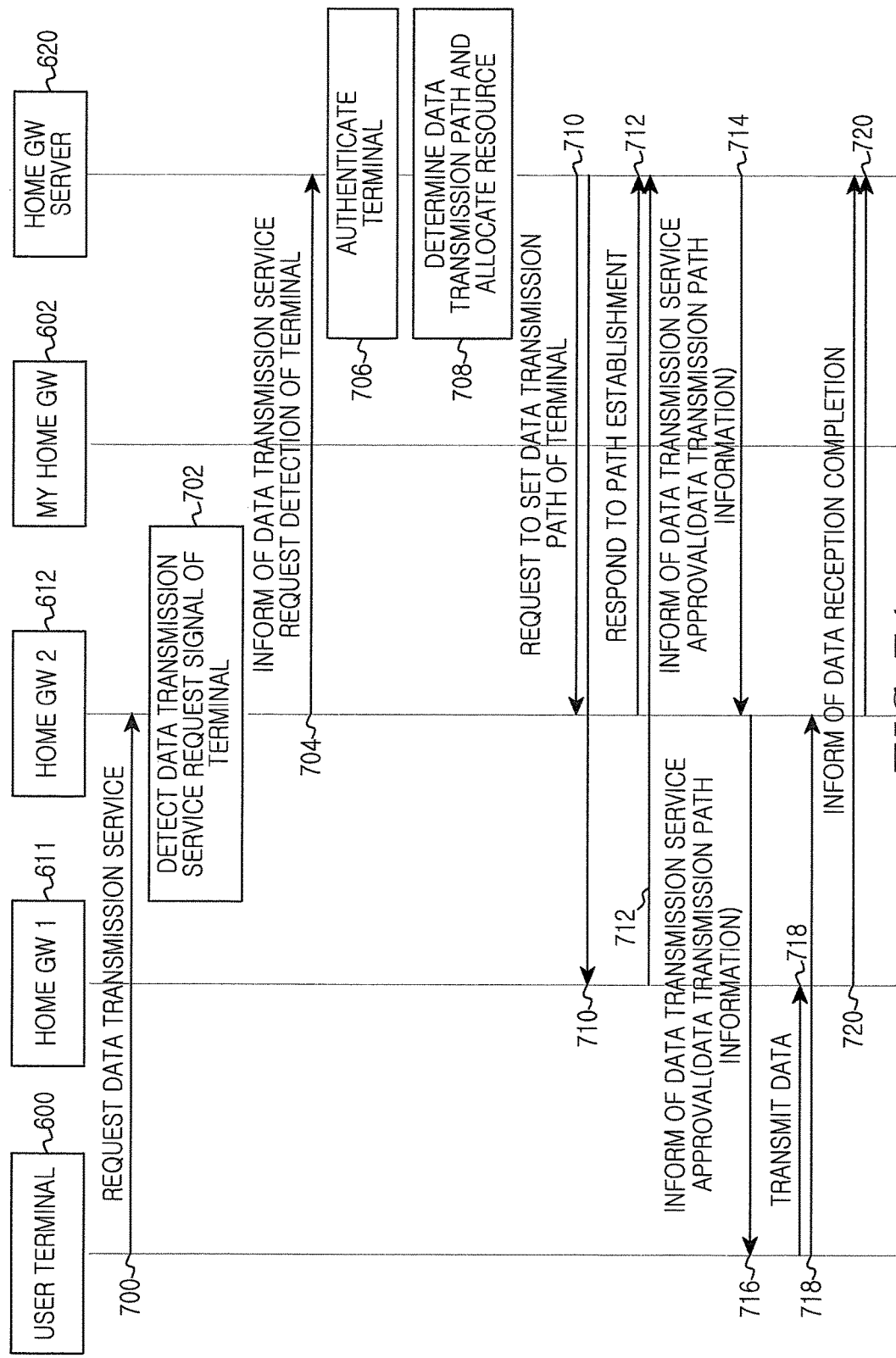
FIGS. 7A and 7B illustrate signaling of the user terminal for transmitting data to the user terminal's home gateway using the home gateway network according to an exemplary embodiment of the present disclosure.
Figure 7B:
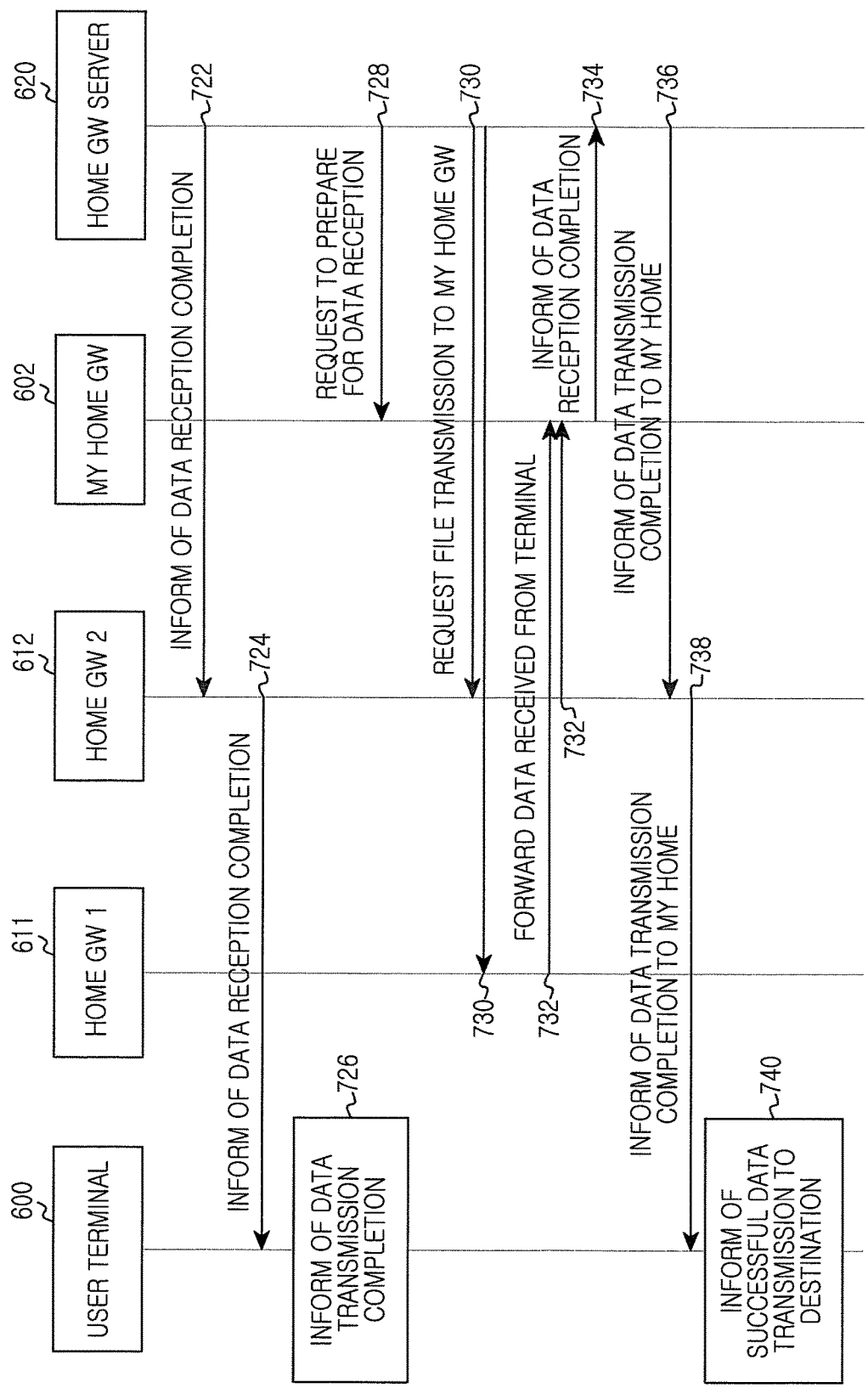

Now, the signaling procedure of FIG. 6 is elucidated by referring to FIGS. 7A and 7B. Herein, the service signal of the user terminal is detected by the home GW.

FIGS. 7A and 7B illustrate signaling of the user terminal for transmitting data to the user terminal's home GW using the home GW network according to an exemplary embodiment of the present disclosure.

Referring to 7A and 7B, the user terminal User_I 600 registered to the my home 602 requests the service for transmitting the data to the my home 602 in step 700. The signal requesting the data transmission service can include the ID of the user terminal, the type of the request service, the authentication information, and the size information of the transmit data.

The home GW2 612 adjacent to the user terminal 600 detects the service request of the user terminal 600 in step 702, and reports the service request signal detection of the user terminal 600 to the home GW server 620 in step 704. The signal requesting the data transmission service can include the home GW ID, the ID of the user terminal, the type of the request service, the authentication information, and the size information of the transmit data. In so doing, the home GW2 612 can detect the location of the user terminal 600 and report the detected location to the home GW server 620.

The home GW server 620 authenticates the user terminal 600 in step 706. That is, the home GW server 620 can determine that the user terminal 600 is the user terminal registered to the my home 602 by comparing the user terminal's pre-stored user authentication information and the ID of the user terminal 600, and examine based on the received authentication information whether the user terminal 600 is authorized to access the dedicated storage of the my home 602. When there is no my home the user terminal 600 is registered to or when the my home the user terminal 600 is registered to exists but the user terminal 600 not is authorized to access the dedicated storage of the my home 602, the home GW server 620 can send a signal rejecting the service request of the user terminal 600 to the home GW2 612.

When successfully authenticating the user, the home GW server 620 determines the path for transmitting the data of the user terminal 600 to the my home 602 and allocates the resource in step 708. Herein, the home GW server 620 can determine at least one home GW for receiving the data from the user terminal 600 by considering the location of the user terminal 600, the location of the my home 602, the locations of the home GWs, the traffic condition of the home GWs, the wireless access use status, and the available capacity of the shared storage. Herein, when determining a plurality of home GWs, the home GW server 620 can determine the data size of each home GW to receive from the terminal by considering the transmit data size and the available capacity of the shared storage of each determined home GW.

When the home GW1 611 and the home GW2 612 are set to the transmit path, the home GW server 620 requests the home GW1 611 and the home GW2 612 to establish the data transmit path of the terminal in step 710, and receives the response signals of the path establishment from the home GW1 611 and the home GW2 612 in step 712. Next, the home GW server 620 sends the service approval signal including the data transmit path information of the user terminal to the home GW2 612 which detects the signal of the user terminal 600 in step 714. The home GW2 612 forwards the service approval signal including the data transmit path information to the user terminal 600 in step 716. Herein, the data transmit path information includes the information of the home GW for communicating with the user terminal 600. When the plurality of home GWs is to communicate, the data transmit path information can include the data size of each home GW.

In step 718, the user terminal 600 transmits the data destined for the my home 602 to the home GW1 611 and the home GW2 612. In so doing, the user terminal 600 can identify the home GW for the data transmission and the data size of the home GW based on the service approval signal. When transmitting the data to the plurality of the home GWs, the user terminal 600 can divide and transmit the data to the my home 602 based on the data size of each home GW.

The home GW1 611 and the home GW2 612 receive all the data from the user terminal 600 and temporarily store the received data to the shared storage, and send the signal informing of the terminal data reception completion to the home GW server 620 in step 720. The home GW server 620 sends the signal informing of the data reception completion to the home GW2 612 in step 722. The home GW2 612 forwards the signal informing of the data reception completion to the user terminal 600 in step 724.

The user terminal 600 informs the user of the data transmission completion in step 726. Herein, the data transmitted by the user terminal 600 does not arrive at the my home 602 but is temporarily stored to the shared storage of the home GW1 611 and the home GW2 612. Thus, the data transmission within the relatively shorter time than the related art can be achieved. That is, when the data is transmitted to the my home via the AP according to the related art, the user terminal needs to stand by until the transmit data arrives at the my home via the AP. By contrast, since the user terminal of the present disclosure stands by only until the transmit data is temporarily stored to the home GW of the other user in the vicinity, the user can stand by merely for the relative short time and then perform other operation.

The home GW server 620 requests the my home 602 to get ready to receive the data in step 728, and requests the home GW1 611 and the home GW2 612 to transmit the corresponding data to the my home 602 in step 730. The home GW1 611 and the home GW2 612 transmit the temporarily stored data to the my home 602 in step 732. When the data reception is completed, the my home 602 informs the home GW server 620 of the data reception completion in step 734. The home GW server 620 sends to the home GW2 612 the signal informing of the data transmission completion to the my home in step 736. The home GW2 612 forwards the signal informing of the data transmission completion to the my home, to the user terminal 600 in step 738.

Next, the user terminal 600 can inform the user of the successful data transmission to the destination in step 740.

As above, when the user terminal 600 transmits the data to the home GW1 611 and the home GW2 612, the home GW1 611 and the home GW2 612 temporarily store and forward the data to the my home 602. Yet, the home GW2 612 may not store the data received from the user terminal 600 according to the traffic condition, the wireless access use status, and the available capacity of the shared store of the home GWs, but may forward the data to other home GW3 613 so that the home GW3 613 can forward the data to the my home 602.

In the second example, the user terminal outside the home transfers the data of the my home to the other location.

Figure 8A:
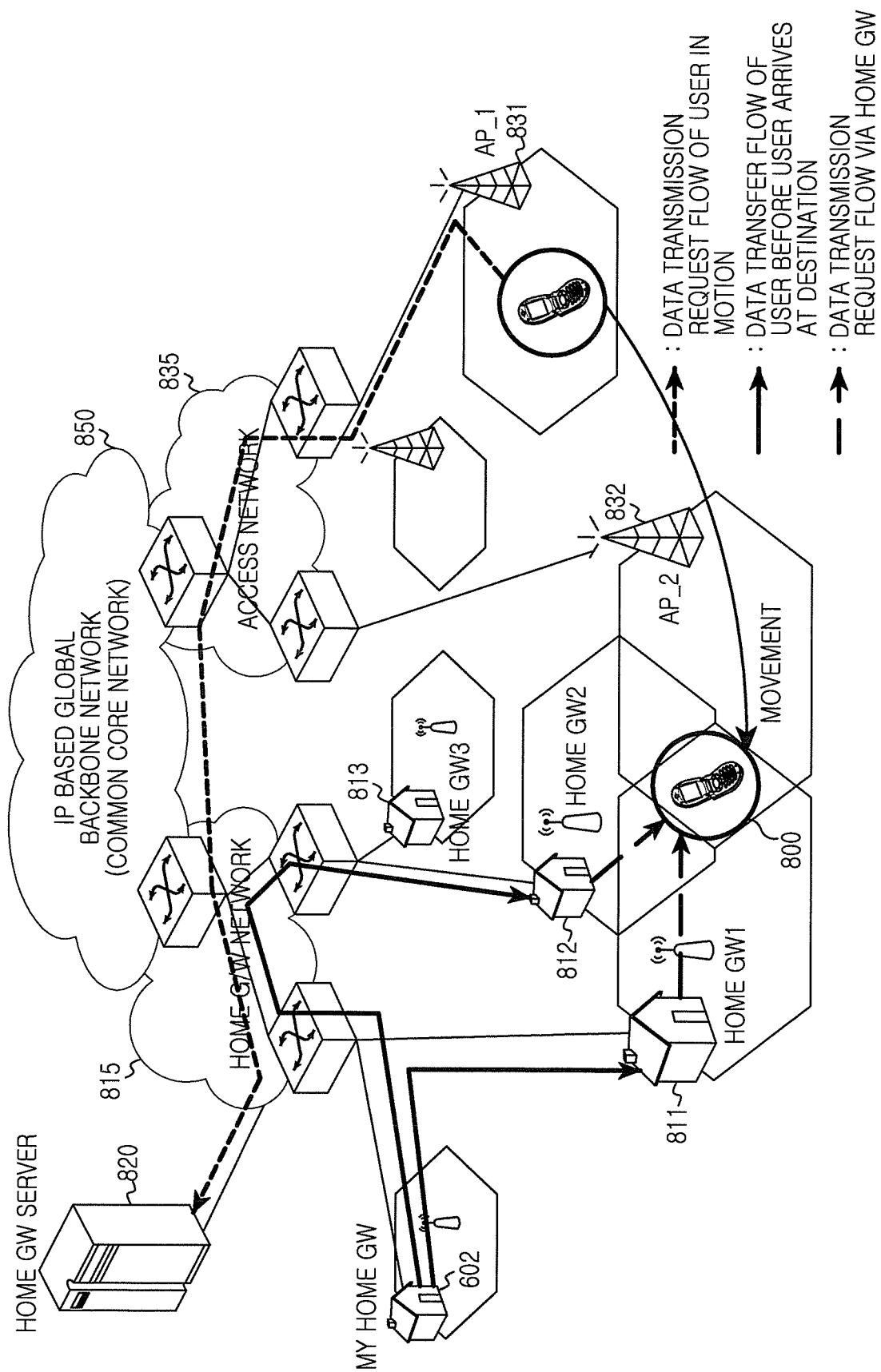
FIGS. 8A and 8B illustrate signal flows of the user terminal for transferring data stored to the home gateway to an intended place over the home gateway network according to another exemplary embodiment of the present disclosure.
Figure 8B:
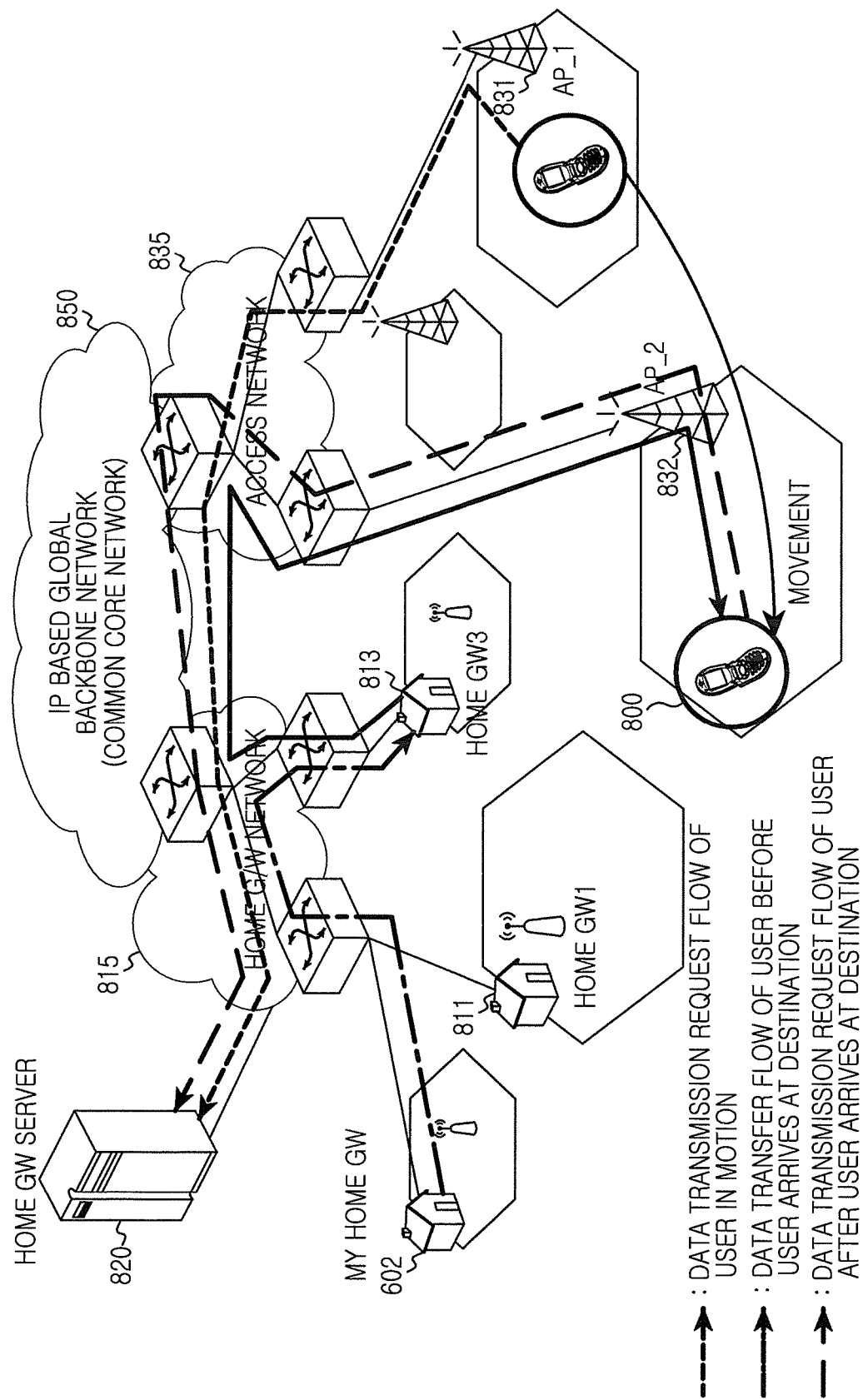

FIGS. 8A and 8B illustrate signal flows of the user terminal for transferring data stored to the home GW to an intended place using the home gateway network according to another exemplary embodiment of the present disclosure.

As shown in FIG. 8A, a user terminal User_I 800 registered to a my home 802 is assumed to migrate from a region of an AP_1 831 to the overlapping location of a region of a home GW1 811, a region of a home GW2 812, and a region of an AP_2 832 of the access network.

In this situation, when the user terminal 800 requests a service for transferring the data of the my home to a particular place, the AP_1 831 detects and reports the service request to the home GW server 820 of the home GW network 815 via the backbone network 850 associated with the access network 835. In so doing, the AP_1 831 can locate the user terminal 800 and report the detected location to the home GW server 820. The home GW server 820 authenticates the user terminal 800 and sets the corresponding service path by determining the home GW for transferring the data of the my home 802 using the destination location requested by the user terminal 800. Since the destination location requested by the user terminal 800 is in the overlapping region of the region of the home GW1 811 and the region of the home GW2 812, the home GW server 820 can determine the home GW1 811 and the home GW2 812 as the service path of the user terminal 800. Notably, the home GW server 820 may select either home GW by considering the traffic condition, the wireless access use status, and the available capacity of the shared storage of the home GW1 811 and the home GW2 812, or determine the data capacity of the two home GWs to receive from the my home 802. In so doing, the home GW server 820 can set the routing path between the my home and the home GW1 811 and the home GW2 812. Next, the home GW server 820 transmits the service path information to the home GW1 811 and the home GW2 812 which are set to the service path of the terminal, and the user terminal 800 so that the user terminal 800 can receive the data from the home GW1 811 and the home GW2 812 when the data arrives at the destination. Under the control of the home GW server 820, the my home 802 can divide the data in a certain size and transmit the divided data to the home GW1 811 and the home GW2 812. The home GW1 811 and the home GW2 812 can forward the data received from the my home 802 to the user terminal 800 under the control of the home GW server 820.

Now, it is assumed that the user terminal User_I 800 registered to the my home 802 is assumed to migrate from the region of the AP_1 831 to the region of the AP_2 832 as shown in FIG. 8B.

In this situation, when the user terminal 800 requests the service for transmitting the data of the my home to a particular place, the AP_1 831 detects and reports the service request to the home GW server 820 of the home GW network 815 over the backbone network 850 associated with the access network 835. In so doing, the AP_1 831 can locate the user terminal 800 and report the detected location to the home GW server 820. The home GW server 820 authenticates the user terminal 800 and sets the corresponding service path by determining the home GW for transferring the data of the my home 802 using the destination location requested by the user terminal 800. Since there is no home GW corresponding to the destination location requested by the user terminal 800, the home GW server 820 can determine the home GW3 831 adjacent to the destination location as the service path, and establish the routing path from the my home 802 to the home GW3 831 and the routing path from the home GW3 831 to the AP_2 832 of the destination. Notably, the home GW server 820 can determine one or more home GWs by considering the traffic condition, the wireless access use status, and the available capacity of the shared storage of the adjacent home GWs. Next, the home GW server 820 transmits the service path information to the home GW3 813 which is set to the service path of the terminal, the AP_2 832, and the user terminal 800 so that the user terminal 800 can receive the data from the home GW3 813 via the AP_2 832 when the data arrives at the destination. Under the control of the home GW server 820, the my home 802 can transmit the data to the home GW3 813. The home GW3 813 can forward the data received from the my home 802 to the AP_2 832 under the control of the home GW server 820, and the AP_2 832 can forward the received data to the user terminal 800.

As above, the data of the my home is transferred to the home GW corresponding to the particular location according to the request of the user terminal outside the home, and the user terminal receives the data from the home GW at the particular location. The user moves the data in advance while traveling to the particular location and then receives the data from the corresponding home GW after arriving at the particular location. Thus, the time required to receive the data can be saved. For example, when the user, who is moving to an appointed place outside the region of the my home, remembers that he/she left material for the appointment in the dedicated storage of the my home, the user can request to transfer the material stored to the my home to a home GW near the appointed place via the adjacent AP or home GW. Hence, the user can arrive at the appointed place and receive the material from the corresponding home GW without having to go back to the my home.

Figure 9:
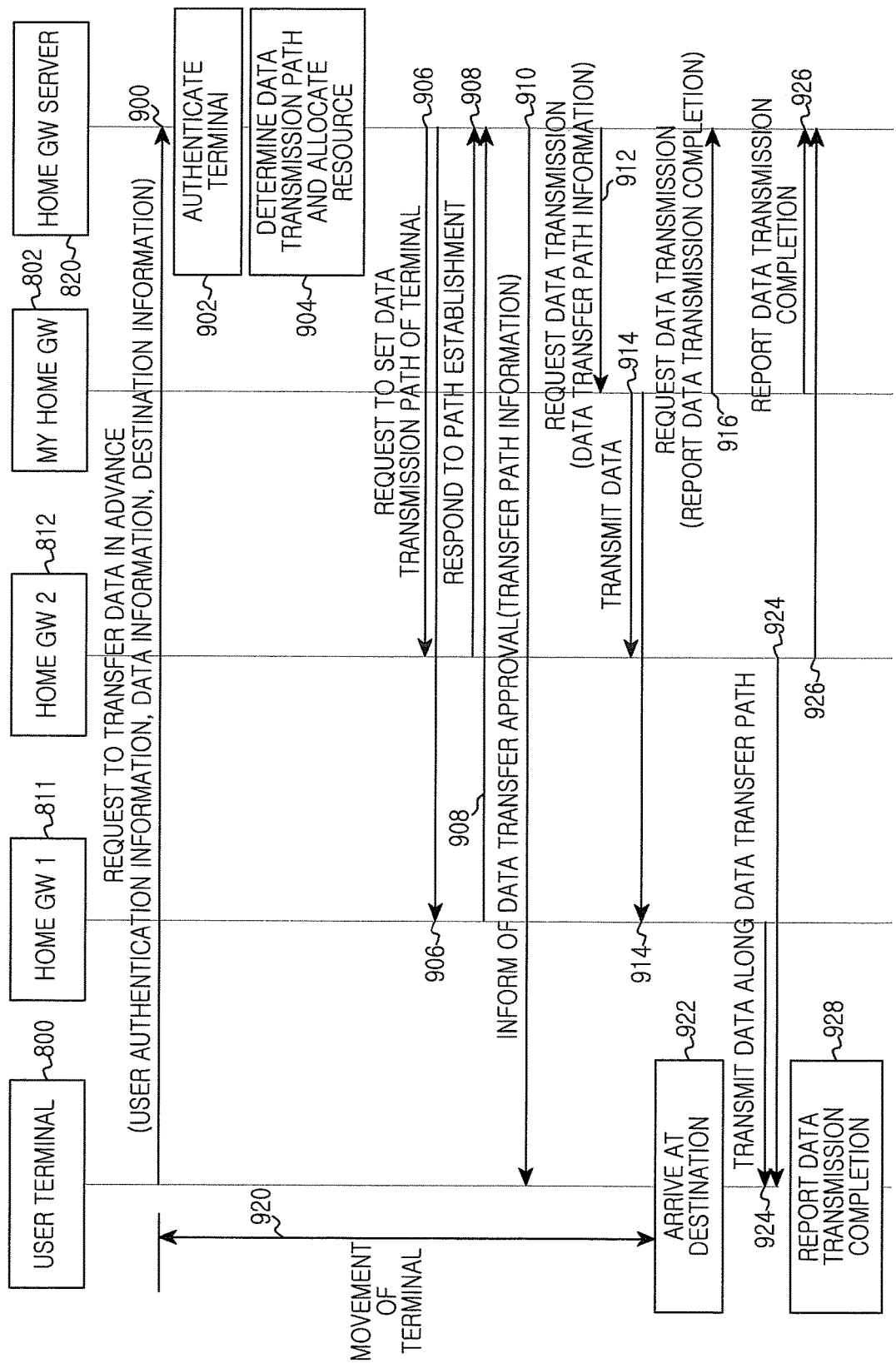
FIG. 9 illustrates signal flows of the user terminal for transferring data stored to the home gateway to an intended place using the home gateway network according to another exemplary embodiment of the present disclosure.

Now, the signaling of FIG. 8A is described in more detail by referring to FIG. 9.

FIG. 9 illustrates signal flows of the user terminal for transferring data stored to the home GW to an intended place using the home GW network according to another exemplary embodiment of the present disclosure.

Referring to FIG. 9, the user terminal User_I 800 registered to the my home 802 requests the service for transferring the data stored to the my home 802 to a particular location in step 900. The signal requesting the data transmission service can include the ID of the user terminal, the type of the request service, the authentication information, the data name, the data storage location, the destination, and the expected destination arrival time of the user.

Herein, the service request signal of the user terminal 800 can be delivered to the home GW server 820 via the adjacent AP (not shown) or home GW (not shown).

The home GW server 820 authenticates the user terminal 800 in step 902. That is, the home GW server 820 can determine that the user terminal 800 is the user terminal registered to the my home 802 by comparing the home GW server 820 pre-stored user authentication information and the ID of the user terminal 800, and examine based on the received authentication information whether the user terminal 800 is authorized to access the dedicated storage of the my home 802. When there is no my home the user terminal 800 is registered to or when the my home 802 the user terminal 800 is registered to exists but the user terminal 800 not is authorized to access the dedicated storage of the my home 802, the home GW server 820 can send a signal rejecting the service request of the user terminal 800 to the user terminal 800.

When successfully authenticating the user, the home GW server 820 determines the path for transmitting the data requested by the user terminal 800 from the my home 802 to the destination and allocates the resource in step 904. Herein, the home GW server 820 can determine at least one home GW for transferring the data of the my home 802 by considering the location of the destination, the locations of the home GWs, the traffic condition of the home GWs, the wireless access use status, the available capacity of the shared storage, the expected destination arrival time of the user, and the expected transmission time per home GW. Herein, when determining the plurality of the home GWs, the home GW server 820 can determine the data size of each home GW to receive from the my home 802 by considering the transmit data size and the available capacity of the shared storage of each determined home GW.

When the home GW1 811 and the home GW2 812 are set to the transmit path, the home GW server 820 requests the home GW1 811 and the home GW2 812 to establish the data transmit path of the terminal in step 906, and receives the response signals of the path establishment from the home GW1 811 and the home GW2 12 in step 908. Next, the home GW server 820 sends the service approval signal including the data transfer path information to the user terminal 800 via the home GW or the AP which detects the signal of the user terminal 800 in step 910. Herein, the data transfer path information can include the information of the home GW for communicating with the user terminal 800. When the plurality of the home GWs is to communicate, the data transfer path information can include the data size of each home GW.

In step 912, the home GW server 820 requests the data transmission to the my home 802. The data transmission request signal includes the data name to move, the data location information, and the data transfer path information so that the my home 802 can identify the data to move and the home GW to transmit the corresponding data. When the transfer path includes the plurality of the home GWs, the data transmission request signal should include the data size of each home GW.

In step 914, the my home 802 transmits the data requested by the user terminal 800 to the home GW1 811 and the home GW2 812. Upon completing the transmission, the my home 802 reports the data transmission completion to the home GW server 820 in step 916. The home GW1 811 and the home GW2 812 receiving the data from the my home 802 temporarily store the received data until the request of the user terminal 800 or the home GW server 820 is received.

When the user terminal 800 moves to the destination in step 920 and arrives at the destination in step 922, the home GW1 811 and the home GW2 812 transmit the data received from the my home 802 and temporarily stored, to the user terminal 800 in step 924. Herein, the home GW1 811 and the home GW2 812 receive the information of the user terminal 800 from the home GW server 820 in advance. Accordingly, the home GW1 811 and the home GW2 812 may detect the entry of the user terminal 800 and transmit the temporarily stored data to the user terminal 800 without the request of the user terminal 800 or may transmit the temporarily stored data to the user terminal 800 after receiving the request of the user terminal 800.

Upon completing the transmission of the temporarily stored data, the home GW1 811 and the home GW2 812 report the data transmission completion to the home GW server 820 in step 926. The user terminal 800 informs the user of the completed reception of the data requested to move in step 928.

The signaling of FIG. 9 can be equally applied to FIG. 8B. Yet, the home GW3 813 receiving the data of the my home 802 cannot transmit the data to the user terminal 800 at the destination in FIG. 8B. Hence, the difference lies in that the home GW3 813 transmits the data to the AP_2 832 by receiving the request of the AP_2 832 of the destination or the home GW server 820, and the AP_2 832 of the destination forwards the data to the user terminal 800.

In the third example, the user terminal uses the Internet service outside the home.

Figure 10:
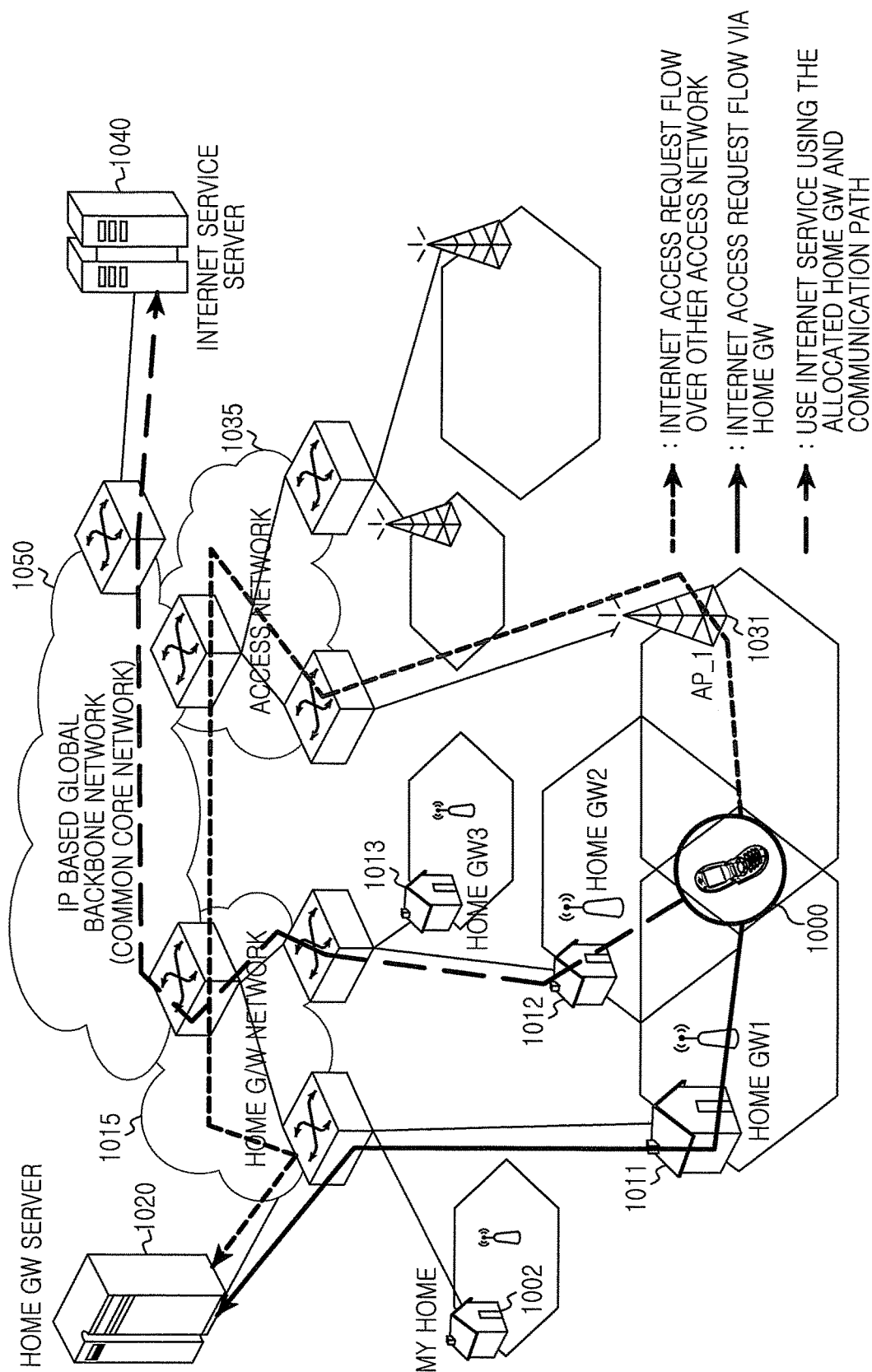
FIG. 10 illustrates signal flows of the user terminal for receiving an Internet service using the home gateway of the other user over the home gateway network according to yet another exemplary embodiment of the present disclosure.

FIG. 10 illustrates signal flows of the user terminal for receiving the Internet service using the home GW of the other user over the home GW network according to yet another exemplary embodiment of the present disclosure.

As shown in FIG. 10, a user terminal User_I 1000 registered to a my home 1002 is assumed to be at an overlapping location of a region of a home GW1 1011, a region of a home GW2 1012, and a region of an AP_1 1031 of the access network.

In this situation, when the user terminal 1000 requests the Internet service, the home GW1 1011 and the home GW2 1012 detect and report the service request of the user terminal 1000 to a home GW server 1020. The AP 1031 may detect and report the service request of the user terminal 1000 to the home GW server 1020 of the home GW network 1015 over the backbone network 1050 associated with the access network 1035. The home GW1 1011, the home GW2 1012, and the AP 1031 can locate the user terminal 1000 and report the location to the home GW server 1020. In so doing, the home GW server 1020 authenticates the user terminal 1000, and sets the service path by determining the home GW capable of communicating with the user terminal 1000 using the physical locations of the home GW1 1011 and the home GW2 1012 detecting the service request of the user terminal 1000 or the reported terminal location. At this time, since the user terminal 1000 travels in the overlapping region of the region of the home GW1 1011 and the region of the home GW2 1012, the home GW server 1020 can determine the home GW1 1011 or the home GW2 1012 as the service path of the user terminal 1000. Notably, the home GW server 1020 may select either home GW by considering the traffic condition, the wireless access use status, and the available capacity of the shared storage of the home GW1 1011 and the home GW2 1012. In so doing, the home GW server 1020 can set the routing path between the selected home GW and an Internet service server 1040. Next, the home GW server 1020 transmits the service path information to the home GW2 1012 which is set as the service path of the terminal, and the user terminal 1000 so that the user terminal 1000 can send and receive signals to and from the home GW2 1012.

That is, in the related art, the user access authority is defined per home GW and the user terminal 1000 cannot use the home GW of some other user than the my home. By contrast, the home GW server of the present disclosure authenticates the user terminal 1000 so that the access to the home GW of the user terminal 1000 is permitted and the user terminal 1000 can receive the Internet service using the home GW of the other user than the my home.

Figure 11:
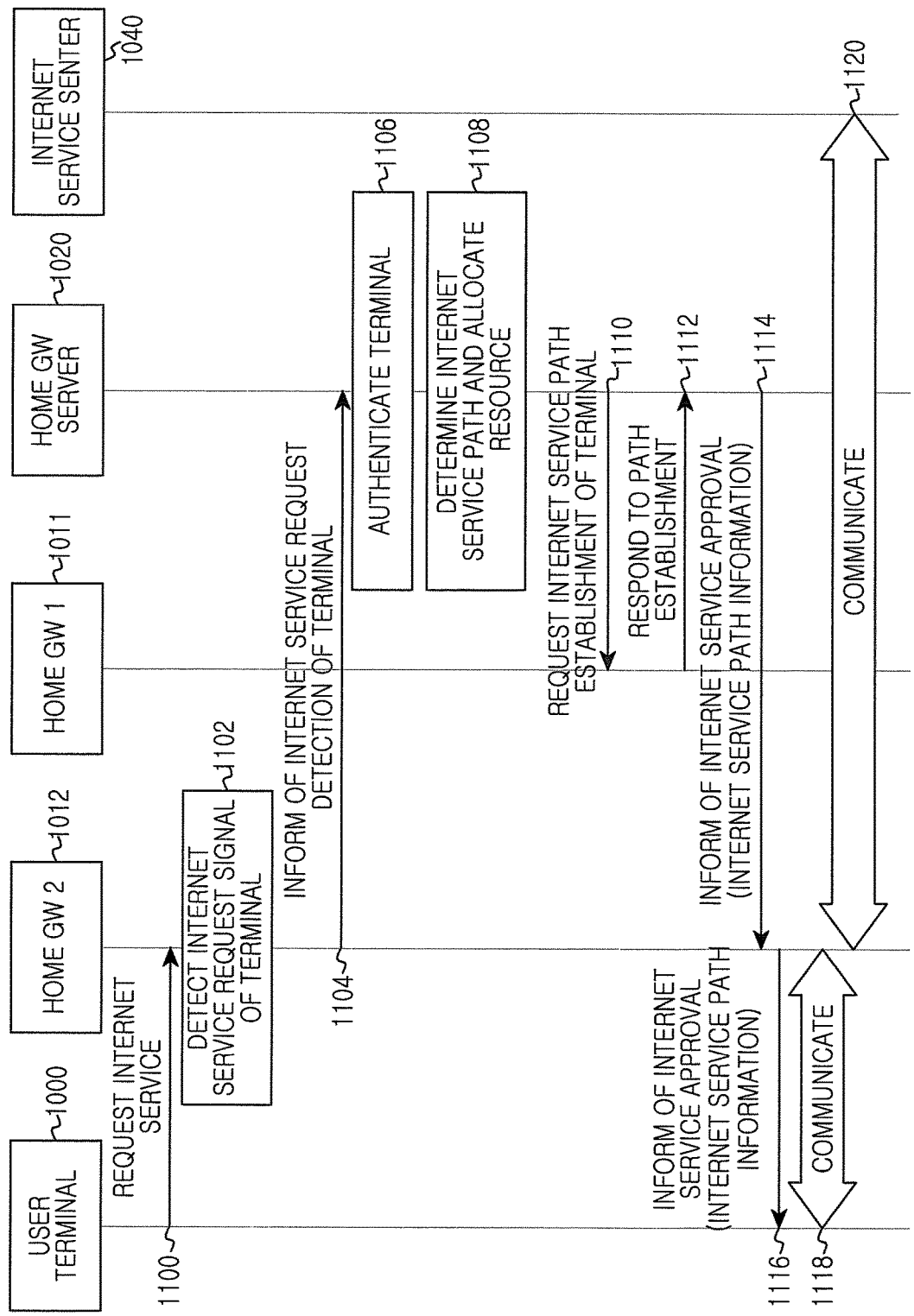
FIG. 11 illustrates signal flows of the user terminal for receiving the Internet service using the home gateway of the other user over the home gateway network according to still another exemplary embodiment of the present disclosure.

Now, the signaling procedure of FIG. 10 is elucidated by referring to FIG. 11. Herein, the service signal of the user terminal is detected by the home GW.

FIG. 11 illustrates signal flows of the user terminal for receiving the Internet service using the home GW of the other user over the home GW network according to still another exemplary embodiment of the present disclosure.

Referring to FIG. 11, the user terminal 1000 registered to the my home (not shown) sends the signal requesting the Internet service in step 1100. The signal requesting the Internet service can include the ID of the user terminal and the type of the request service.

The home GW2 1012 near the user terminal 1000 detects the service request of the user terminal 1000 in step 1102, and reports the service request signal detection of the user terminal 1000 to the home GW server 1020 in step 1104. The signal requesting the data transmission service can include the home GW ID, the ID of the user terminal, and the type of the request service. In so doing, the home GW2 1012 can detect the location of the user terminal 1000 and report the detected location to the home GW server 1020.

The home GW server 1020 authenticates the user terminal 1000 in step 1106. That is, the home GW server 1020 determines that the user terminal 1000 is the user terminal registered to the my home (not shown) by comparing the hone GW server's 1202 pre-stored user authentication information and the ID of the user terminal 1000. When there is no my home the user terminal 1000 is registered to, the home GW server 1020 can send a signal rejecting the service request of the user terminal 1000 to the home GW2 1012.

When successfully authenticating the user, the home GW server 1020 determines the path for providing the Internet service to the user terminal 1000 and allocates the resource in step 1108. Herein, the home GW server 1020 can determine at least one home GW for providing the Internet service to the user terminal 1000 by considering the location of the user terminal 1000, the locations of the home GWs, the traffic condition of the home GWs, the wireless access use status, and the available capacity of the shared storage.

When the home GW2 1012 is set to the transmit path, the home GW server 1020 requests the Internet service path establishment of the terminal to the home GW2 1012 in step 1110, and receives the response signal of the path establishment from the home GW2 1012 in step 1112. Next, the home GW server 1020 sends the service approval signal including the Internet service path information of the user terminal to the home GW2 1012 which detects the signal of the user terminal 1000 in step 1114. The home GW2 1012 forwards the service approval signal including the Internet service path information to the user terminal 1000 in step 1116. Herein, the Internet service path information includes the information of the home GW for communicating with the user terminal 1000.

The user terminal 1000 establishes the communication path and communicates with the home GW2 1012 in step 1118. The home GW2 1012 establishes the communication path with the Internet service server 1040 and performs the communication for the user terminal 1000 in step 1120.

So far, the communication using the home GW network has been explained in FIGS. 2 through 11. The signaling and the information transmitted and received can be variously altered according to the design within the scope of the present disclosure.

Figure 12:
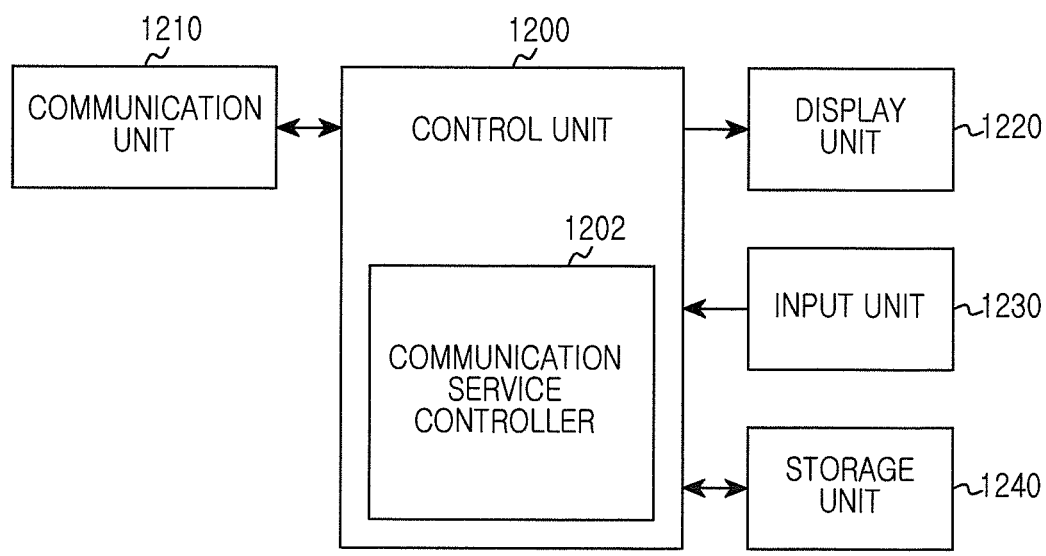
FIG. 12 illustrates the user terminal for supporting the home gateway network according to an exemplary embodiment of the present disclosure.

FIG. 12 is a block diagram of the user terminal for supporting the home GW network according to an exemplary embodiment of the present disclosure.

Referring to FIG. 12, the user terminal includes a control unit 1200, a communication unit 1210, a display unit 1220, an input unit 1230, and a storage unit 1240. The control unit 1200 includes a communication service controller 1202.

The control unit 1200 controls and processes the operations of the terminal. The control unit 1200 including the communication service controller 1202 controls and processes to receive the communication service using the home GW.

The communication service controller 1202 functions to register to the home GW. When the user requests the service to use the home GW network, the communication service controller 1202 controls and processes to collect and transmit necessary information for the service request. In do so doing, the communication service controller 1202 controls and processes to broadcast the service request signal so that the home GW geographically adjacent or the AP (not shown) of the access network can receive the service request signal. When receiving the service approval signal including the service path information from the adjacent home GW or the AP, the communication service controller 1202 controls and processes to operate according to the corresponding service via the home GW corresponding to the service path. That is, the communication service controller 1202 controls and processes to receive the communication service even outside the home using the home GW network as shown in FIGS. 6 through 11.

The communication unit 1210 transmits and receives the signals under the control of the control unit 1200. In particular, under the control of the control unit 1200, the communication unit 1210 transmits the service request signal to the adjacent home GW and the AP, and transmits and receives the signals to and from the home GW of the other user determined by the home GW server.

The display unit 1220 displays various status information, characters, and images generating in the operation of the terminal, and can request to input the necessary information for the service request. For example, when the data transmission service is requested, the display unit 1220 can display a screen requesting to select the data to transmit. When the data transfer service is requested, the display unit 1220 may display a screen requesting to input the data name and the data location of the data to move. When the data transfer service is requested, the display unit 1220 can display a map or an address search window in order to request the user to input the destination information.

The input unit 1230 includes at least one function key or a touch sensor and provides the control unit 1200 with data corresponding to the key pressed by the user or coordinates of the user's touch point. The input unit 1230 receives or selects the information required for the service request, and provides the input information or the selected information to the control unit 1200. For example, the input unit 1230 receives and provides the information indicating the data to transmit, the data name of the data to move, the data location, the destination, the expected destination arrival time of the user, and the authentication information, to the control unit 1200

The storage unit 1240 stores various programs and data required to operate the terminal. Under the control of the control unit 1200, the storage unit 1240 stores the data received from the home GW.

Figure 13:
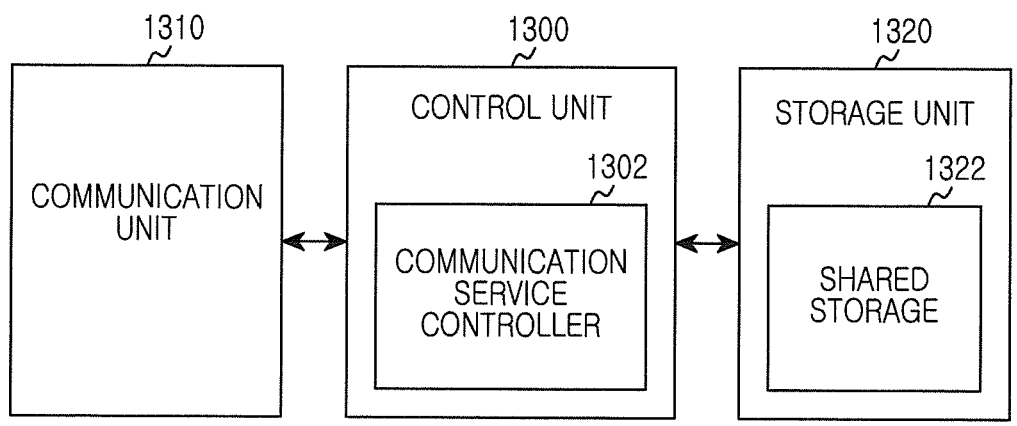
FIG. 13 illustrates the home gateway for building the home gateway network according to an exemplary embodiment of the present disclosure.

FIG. 13 is a block diagram of the home GW for building the home GW network according to an exemplary embodiment of the present disclosure.

Referring to FIG. 13, the home GW includes a control unit 1300, a communication unit 1310, and a storage unit 1320. The control unit 1300 includes a communication service controller 1302.

The control unit 1300 controls and processes the operations of the home GW. The control unit 1300 controls and processes the registration of the terminal. The control unit 1300 including the communication service controller 1302 controls and processes to provide the service to the user of the other home GW under the control of the home GW network. Under the control of the home GW server, the communication service controller 1302 controls and processes to receive and store the data from the user outside the home via the other home GW, and to transmit the user data stored to the dedicated storage of the storage unit 1320 to the user outside the home via the other home GW. That is, the communication service controller 1302 controls and processes the communication service of the user outside the home and the communication service of the other user in the region of the home GW as shown in FIGS. 6 through 11. The control unit 1300 controls and processes to report the current traffic condition, the available capacity of the shared storage, and the wireless access use status to the home GW server on the periodic basis or at preset time points. The control unit 1300 controls and processes to periodically measure the location of the terminal requesting the communication service using the home GW network within the home GW's region and to report the measured location to the home GW server.

The communication unit 1310 transmits and receives the signals under the control of the control unit 1300. In particular, under the control of the control unit 1300, the communication unit 1310 receives the service request signal from the user terminal of the other home GW, and transmits the signal indicating the service request detection of the user terminal to the home GW server. Under the control of the control unit 1300, the communication unit 1310 transmits and receives the data to and from the user terminal of the other home GW or the adjacent home GW, and transmits and receives the user data of the home GW to and from the adjacent home GW.

The storage unit 1320 stores various programs and data required to operate the home GW. According to the present disclosure, the storage unit 1320 is divided into the dedicated storage and the shared storage to store the data of the user registered to the home GW to the dedicated storage and to store the data of the user registered to the other home GW to the shared storage. The dedicated storage and the shared storage are divided logically or physically, and the shared storage is managed by the home GW server. When the dedicated storage and the shared storage are divided logically, the sizes of the dedicated storage and the shared storage may be changed by the home GW server. Herein, the dedicated storage and the shared storage are separated in order to protect private data of the user registered to the home GW.

Figure 14:
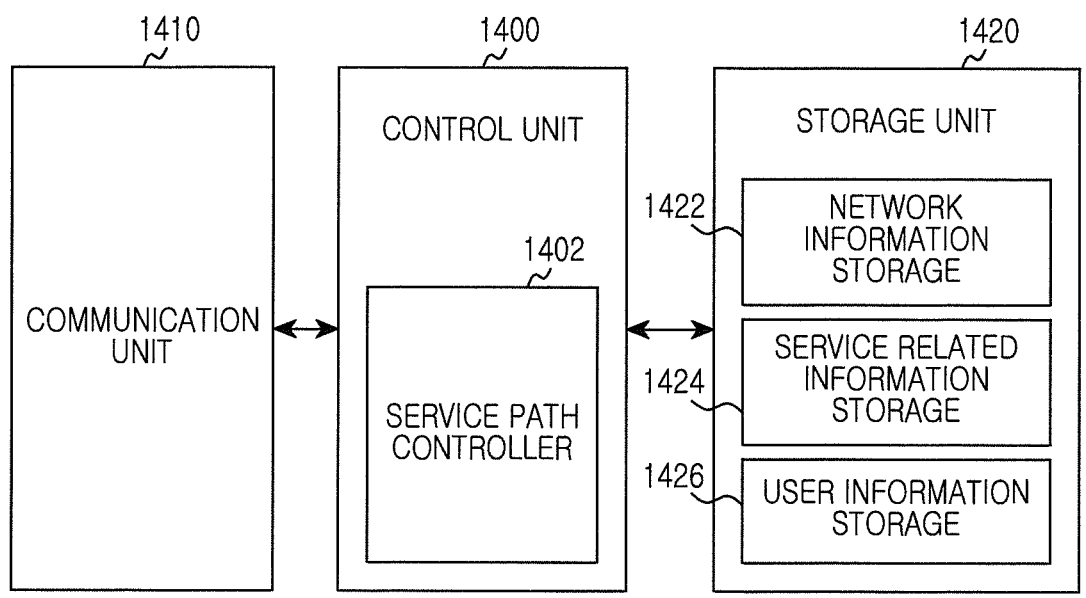
FIG. 14 illustrates the server for managing the home gateway network according to an exemplary embodiment of the present disclosure.

FIG. 14 is a block diagram of the server for managing the home GW network according to an exemplary embodiment of the present disclosure.

Referring to FIG. 14, the home GW server includes a control unit 1400, a communication unit 1410, and a storage unit 1420. The control unit 1400 includes a service path controller 1402. The storage unit 1420 includes a network information storage 1422, a service related information storage 1424, and a user information storage 1426.

The control unit 1400 controls and manages the plurality of the distributed home GWs of the home GW network, and controls and processes to allow the home GW user to communicate using the home GW of the other user. In particular, when the user requests the service to use the home GW network, the control unit 1400 including the service path controller 1402 controls and processes to set the service path according to the service requested by the user. That is, the service path controller 1402 collects and manages the home GW network resource information, the user's service requirement information, and the user information, authenticates the user based on the information, and sets the user service path. The service path controller 1402 controls and processes to change the service path of the user terminal by periodically locating the user terminal. That is, the control unit 1400 controls and manages the home GWs of the home GW network as shown in FIGS. 6 through 11 so that the user of a particular home GW can communicate using the other home GW.

The communication unit 1410 transmits and receives signals under the control of the control unit 1400. Particularly, the communication unit 1410 transmits and receives the signals to and from the home GWs, and transmits and receives the signals to and from the AP of the access network over the IP backbone network under the control of the control unit 1400.

The storage unit 1420 stores various programs and data required to operate the home GW server. Particularly, the storage unit 1420 includes the network information storage 1422, the service related information storage 1424, and the user information storage 1426. The network information storage 1422 stores the information indicating the home GW network condition, for example, the traffic condition (e.g., delay, jitter, and packet loss) per home GW of the home GW network, the wireless access use status of each home GW, the available capacity of the shared storage per home GW, the locations of the home GWs, and the expected transmission time using the home GW. The service related information storage 1424 stores the user's service requirement information, for example, the file name of the data requested by the user, the file transmission location, the destination location, the expected destination arrival time of the user, and the user's current location. The user information storage 1426 stores the user authentication related information, for example, the user home GW information, the user authentication information, and the user's subscription service information.

As set forth above, the plurality of the home GWs establishes the home GW network so that the user outside the home can access the user's home GW or use the Internet service using the home GW of the other user. Therefore, even under the poor channel condition between the user terminal and the wireless network AP, the service desired by the user can be successfully provided.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a terminal in a communication system, the method comprising:
   detecting a service request for using a first home gateway that previously registered to a home gateway server managing a home gateway network including a plurality of home gateways;
   broadcasting a service request signal, the service request signal sent to the home gateway server through at least one second home gateway that receives the service request signal;
   receiving a service approval signal including path information, which is determined by the home gateway server, for connecting a communication channel between the terminal and the first home gateway from at least one of the at least one second home gateway, the service approval signal generated when the terminal is authenticated by the home gateway server;
   identifying at least one second home gateway corresponding to the path information; and
   communicating with the first home gateway via the identified at least one second home gateway,
   wherein, when a request service type is a data transmission service and the identified at least one second home gateway corresponding to the path information is plural, communicating with the first home gateway comprises:
      dividing data to transmit, and
      transmitting the divided data to the plurality of second home gateways and requesting to forward the divided data to the first home gateway.

2. The method of claim 1, wherein the service request signal comprises at least one of user authentication information and the request service type, and
   the request service type comprises at least one of the data transmission service, a data transfer service, or an Internet service.

3. The method of claim 2, wherein, when the request service type is the data transmission service, the service request signal further comprises data size information.

4. The method of claim 2, wherein, when the request service type is the data transfer service, the service request signal further comprises at least one of a data name, a data size, a data storage location, a destination, or an expected arrival time, the method further comprising:
   when the request service type is the data transfer service, transmitting a signal requesting to forward data stored to the first home gateway to the identified at least one second home gateway.

5. The method of claim 2, wherein the path information further comprises an Access Point (AP) of an access network over an internet protocol based global backbone network.

6. An apparatus of a terminal in a communication system, the apparatus comprising:
   a communication unit configured to transmit and receive signals; and
   a control unit configured to control the communication unit to:
      detect a service request for using a first home gateway that previously registered to a home gateway server managing a home gateway network including a plurality of home gateways,
      broadcast a service request signal, the service request signal sent to the home gateway server through at least one second home gateway that receives the service request signal,
      receive a service approval signal including path information, which is determined by the home gateway server, for connecting a communication channel between the terminal and the first home gateway from at least one of the at least one second home gateway, the service approval signal generated when the terminal is authenticated by the home gateway server,
      identify at least one second home gateway corresponding to the path information; and
      communicate with the first home gateway via the identified at least one second home gateway,
   wherein, when a request service type is a data transmission service and the identified at least one second home gateway corresponding to the path information is plural, the control unit is configured to:
      divide data to transmit, and
      control the communication unit to transmit the divided data to the plurality of second home gate ways and request to forward the divided data to the first home gateway.

7. The apparatus of claim 6,
   wherein the service request signal comprises at least one of user authentication information and the request service type, and
   the request service type comprises at least one of the data transmission service, a data transfer service, or an Internet service.

8. The apparatus of claim 7, wherein, when the request service type is the data transmission service, the service request signal further comprises data size information.

9. The apparatus of claim 7, wherein, when the request service type is the data transfer service, the service request signal further comprises at least one of a data name, a data storage location, a destination, or an expected arrival time, and
   when the request service type is the data transfer service, the control unit is configured to control to transmit a signal requesting to forward stored to the first home gateway to the identified at least one second home gateway.

10. The apparatus of claim 7, wherein the path information further comprises an Access Point (AP) of an access network over an internet protocol based global backbone network.

* * * * *